United States Patent [19]

Costanzo

[11] 4,115,896
[45] Sep. 26, 1978

[54] VEHICLE INTERIOR CLEANING SYSTEM
[75] Inventor: Dean V. Costanzo, Chittenango, N.Y.
[73] Assignee: Costanzo Bus Bath, Inc., Chittenango, N.Y.
[21] Appl. No.: 857,368
[22] Filed: Dec. 5, 1977
[51] Int. Cl.² .............................................. B60S 3/00
[52] U.S. Cl. ...................................... 15/301; 15/345; 134/21
[58] Field of Search ................. 15/300, 301, 313, 314, 15/315, 345; 134/21

[56] References Cited
U.S. PATENT DOCUMENTS
2,677,629   5/1954   Buck .................................. 15/314 X
FOREIGN PATENT DOCUMENTS
1,025,659   4/1966   United Kingdom ....................... 15/301

Primary Examiner—Edward L. Roberts
Attorney, Agent, or Firm—Charles S. McGuire

[57] ABSTRACT

An air flow cleaning system for the interior of a bus, or other such enclosed space, wherein a motor-driven fan pulls air through the bus, into a housing communicating with the bus door, collects and compacts all dirt and trash removed from the bus by the air stream, and discharges essentially clean air from the housing. Among the unique and advantageous features of the system are: no trash passes through the fan; the closure means contacting the bus exterior is automatically self-aligning; no voluminous trash collection enclosure or water spray within the collection enclosure are required since dirt and trash are separated by centrifugal force and delivered to a compaction chamber; and, the air stream which carries the dirt and trash from the bus is more concentrated at floor level.

10 Claims, 9 Drawing Figures

VEHICLE INTERIOR CLEANING SYSTEM

BACKGROUND OF THE INVENTION

The present invention relates to systems for removing dirt and trash from the interior of an enclosure by relatively high volume air flow therethrough. More specifically, the invention relates to apparatus in the form of a housing containing a fan for drawing air into an opening which is placed in communication with an open bus door to create an air stream carrying dirt and trash from the bus interior to the housing, where it is compacted and removed as a solid mass and from which clean air is discharged.

One of the principal methods of removing dirt and trash from the interiors of buses, and the like, is that disclosed in U.S. Pat. No. 2,677,629, of William J. Buck, issued May 4, 1954. According to that method, a duct having an exhaust fan is placed in sealing communication with the interior of the bus through the open front door thereof. The two rearmost windows are opened, whereby operation of the fan creates an air stream through the bus from rear to front. An operator walks from the rear to the front of the bus while directing a concentrated air blast from one or more nozzles on the seat, wall and floor surfaces to dislodge dirt and trash which are thus carried out of the bus door by the air stream created by the aforementioned fan.

While this cleaning method is generally preferable to manual cleaning with brooms, dustcloths, etc., there are a number of objectionable features associated with the equipment presently available for effecting air stream cleaning. Typically, the dirt and trash are collected in a rather voluminous "trash house" wherein a water spray is utilized to keep down the dust and more or less consolidate the mass of dirt and trash. The space required to accommodate and difficulty in moving the large trash house and the problems attendant with disposal of the water-soaked mass of dirt and trash are among the disadvantages. Also, the fan which creates the air flow through the bus is installed in a duct section through which all dirt and trash removed from the bus passes. Thus, there is the possibility of the fan becoming damaged or clogged with the debris passing therethrough.

The apparatus shown and described in aforementioned U.S. Pat. No. 2,677,629 for carrying out the cleaning method thereof includes ductwork extending through the roof for positioning the exhaust end externally of the building since a large amount of very dirty air is discharged at this point. For economy of installation, as well as for environmental reasons, it would be desirable to discharge only clean air from the cleaning equipment so that the exhaust opening could be located inside the building. Also, the overhead suspension system required to support the movable end of the duct which engages the bus about the front door adds to the cost and complexity of the apparatus.

It is a principal object of the present invention to provide a novel and improved air current cleaning system for enclosed spaces such as the interior of buses, and the like.

Other objects are: to provide apparatus for cleaning bus interiors by an air stream which discharges only essentially clean air; to provide air stream vehicle cleaning apparatus requiring no trash house for collection of debris or water spray for consolidation thereof; to provide apparatus of the character described having a portion movable into sealing engagement with the exterior surface of a bus around the perimeter of the door which is automatically self-aligning and requires no overhead or other supports external to the apparatus itself; to provide cleaning apparatus for removal of dirt and trash from a bus interior, or the like, by an air stream carried into and through the apparatus by a fan installed therein, but wherein essentially no dirt or trash passes through the fan.

Other objects will in part be obvious and will in part appear hereinafter.

SUMMARY OF THE INVENTION

In accordance with the foregoing objects, the invention is embodied in apparatus including a housing having an opening surrounded by a flange or frame movable into sealing engagement with the exterior of a bus around the periphery of the open front door thereof to place the interior of the bus and the cleaning apparatus housing in direct communication. The frame is connected to the main housing by a flexible, rectangular-section duct and is movable by means of a pair of air cylinders and associated likage which pivots vertically as the frame contacts the bus to align the frame automatically in securely sealed relation with the door opening. The flexible duct leading from the door opening to the interior of the housing extends essentially the full width of the door from at or near the bus floor level upwardly for a fraction of the door height.

The main housing includes a box-like outer shell and an inner shell having parallel front and rear walls with essentially coaxial convolute and cylindrical sections therebetween. A high capacity exhaust fan is mounted in an open ended cylindrical duct supported within the inner shell and extending axially of the convolute and cylindrical sections. When the fan is operated to direct air through the cylindrical duct, exhaust is through one end of the duct and an end wall of the housing to the outside, with air being drawn into the other end of the duct from inside the inner shell in an area about midway between the ends thereof. Air is thus drawn into the inner shell through the opening communicating with the interior of the bus to replace that exhausted by the fan, thereby creating the air stream carrying the dirt and trash from the bus interior into the housing of the cleaning apparatus.

The air stream from the bus interior through the flexible duct enters the inner shell of the housing tangentially to the convolute section at the forward end, through which the cylindrical duct exhausts. Thus, in order to enter the open end of the duct within the inner shell the air must first travel from the front toward the rear end wall. As it does so, the air travels in a spiral or torroidal path due to its tangential entrance into the convolute section of the shell. Dirt and trash in the air stream are thus directed by centrifugal force toward the outside of the rotating air mass, that is, toward and along the convoluted and cylindrical inner surfaces of the shell.

A portion of the inner shell wall opens into a trash receiving and compaction section in the area adjacent to and extending forwardly from the rear end wall. The dirt and trash being carried along within the inner shell and urged by centrifugal force toward the interior surfaces thereof is thus deposited in the compaction section. The air entering the cylindrical duct in an area centrally of the shell is essentially clean as it is exhausted to the area outside the housing. The dirt and trash are compacted and ejected from the housing in a tightly consolidated mass into a flexible trash bag, or other suitable receptacle.

BRIEF DESCRIPTION OF THE DRAWINGS

The above and other novel features of the invention will be more fully understood from the following detailed description taken in connection with the accompanying illustrative drawings of the preferred embodiment, wherein.

DETAILED DESCRIPTION

Figure 1:
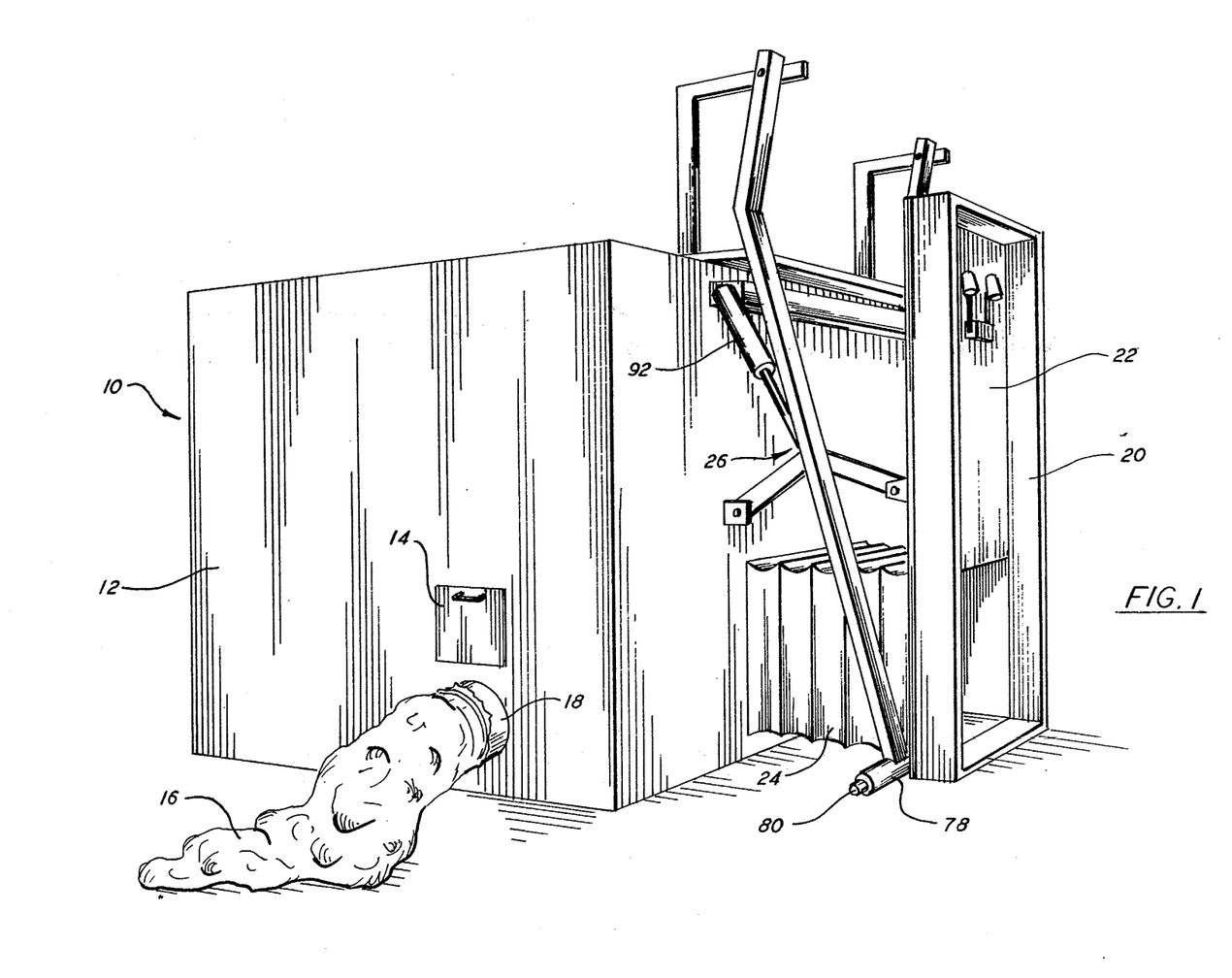
FIG. 1 is a perspective view of the exterior of the apparatus.

The external appearance of the cleaning apparatus is shown in FIG. 1 and includes a main housing, denoted generally by reference numeral 10, formed by box-like outer shell 12 and an inner shell, described later herein, enclosed within the outer shell. Inspection and access door 14 is movable between covering and uncovering positions with respect to an opening in outer shell 12 and an adjacent opening in the inner shell. Flexible bag 16, or other suitable trash receptacle, is clamped securely to flange 18 which encircles the trash outlet opening of housing 10. Rectangular frame 20 defines an opening dimensioned for registration with the front door opening of a bus with frame 20 engaging the exterior surface of the bus about the periphery of the door opening. The upper portion of frame 20 is covered by wall 22 and the lower portion opens into one end of flexible duct 24, the other end of which communicates with the interior of the inner shell of housing 10. Frame 20 is connected to housing 10 by linkage 26 for selective movement between retracted and extended positions with respect thereto, as described later in more detail, with duct 24 folding and unfolding in accordian fashion during such movement.

Figure 2:
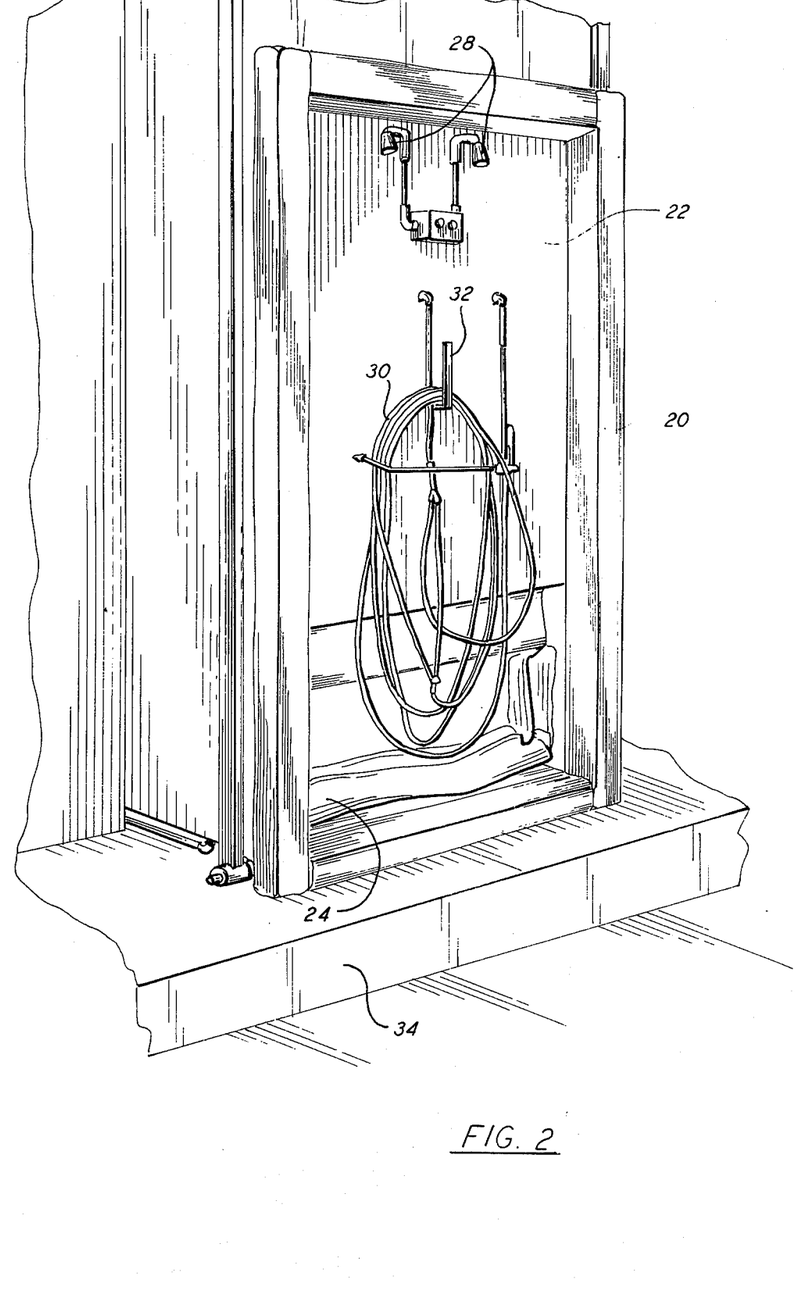
FIG. 2 is a fragmentary perspective view of a portion of the apparatus of FIG. 1.

Frame 20 and the portion of housing 10 to which it is attached are shown in greater detail in FIG. 2. On the side of wall 22 which faces the interior of the bus when frame 20 is in engagement therewith are mounted floodlights 28, providing bright illumination for the forward interior of the bus, and air supply hoses 30. The latter are hung on bracket 32 on wall 22 and are connected to an appropriate supply of compressed air which is released through nozzles with which hoses 30 are fitted. The floor or underlying support for the cleaning apparatus is elevated by step 34 from the surface upon which the bus stands as it is cleaned in order that the bottom of frame 20 may be in approximately vertical registration with the bus door opening.

Figure 3:
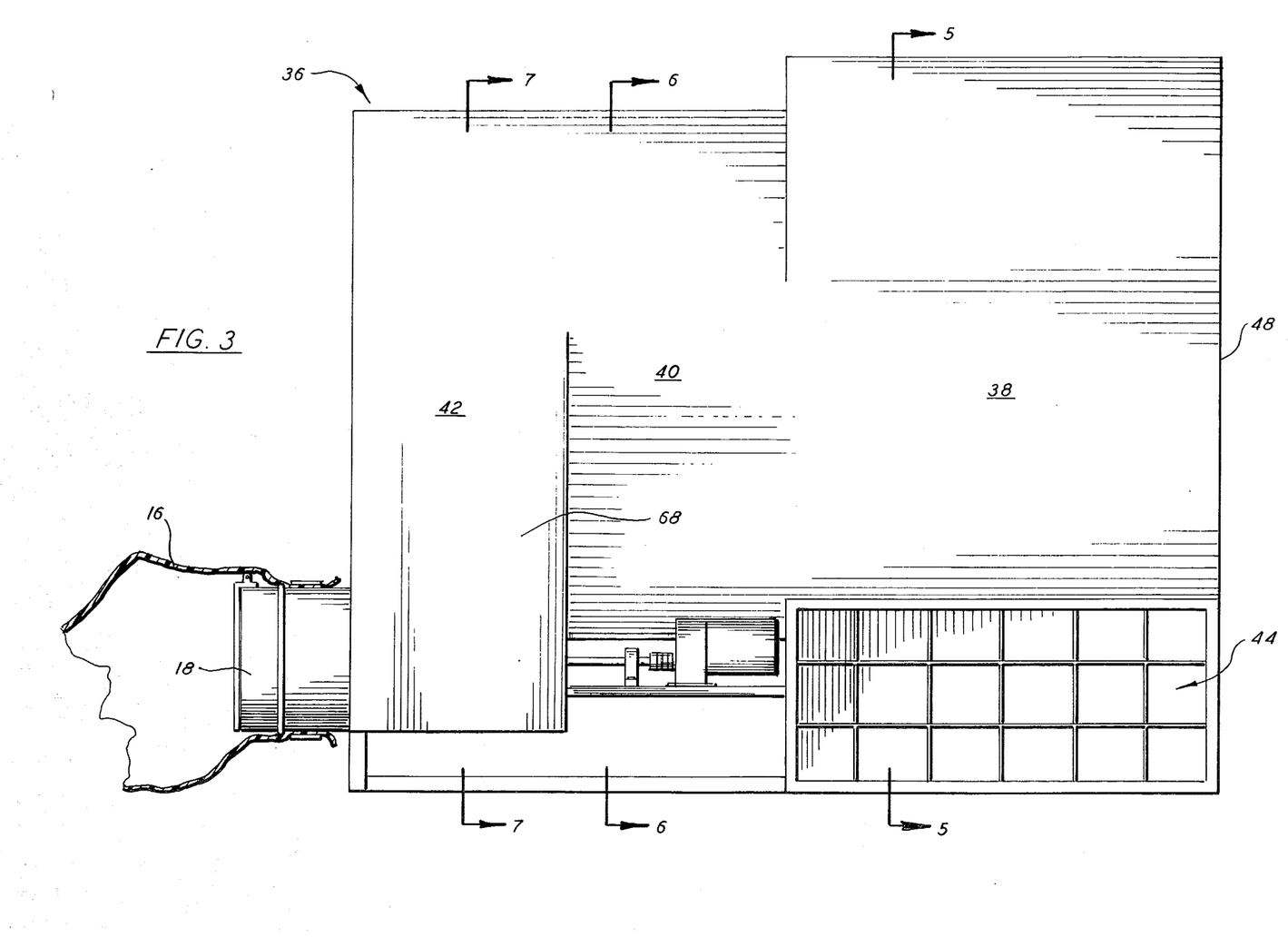
FIG. 3 is a side elevational view of the apparatus with certain portions removed.
Figure 4:
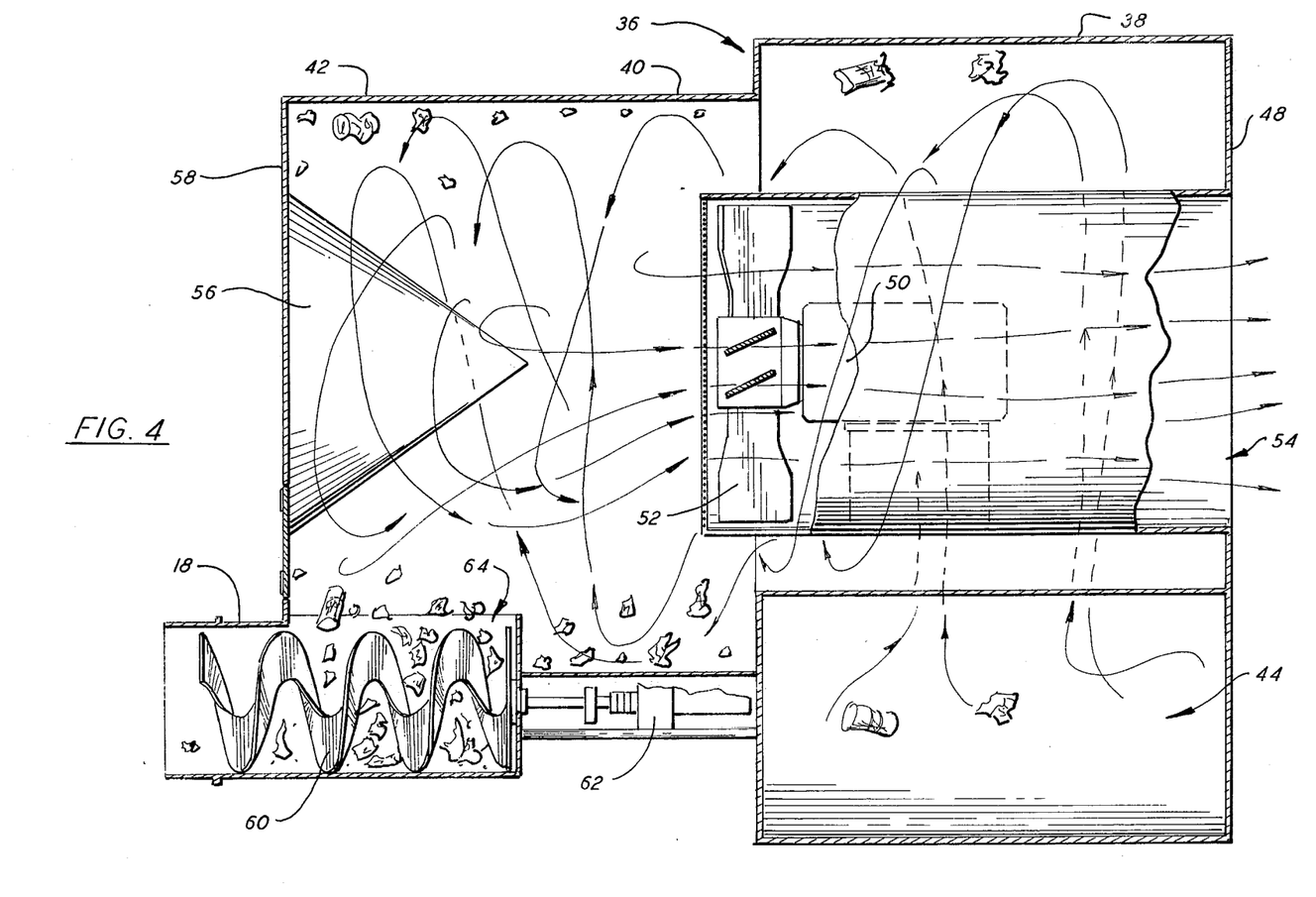
FIG. 4 is a side elevational view in transverse section.

FIGS. 3 and 4 illustrate the exterior and interior, respectively of the aforementioned inner shell generally by reference numeral 36 in side elevation. Section 38 extends from one end, termed the front end for reference purposes, for approximately one-half the length of inner shell 36. The rear section is comprised of central and rear portions 40 and 42, each about one-quarter of the inner shell length. Flexible duct 24 communicates with the interior of inner shell 36 through opening 44, which is located on the lower side of and extends for approximately the same width as, section 38.

Cylindrical duct 46 is supported at one open end upon front wall 48 of inner shell 36 and extends inside the inner shell, coaxially thereof, to a second open end within portion 40 of the rear section of the shell. Motor 50 drives fan blades 52 to exhaust air from the interior of inner shell 36, through cylindrical duct 46 and out of opening 54, and an opening in the outer shell in registration therewith, to the outside atmosphere. Conical projection 56 is supported internally of inner shell 36 at its base upon rear wall 58 and extends forwardly approximately the length of section 42. Both cylindrical duct 46 and conical projection 56 are coaxially mounted within the inner shell.

Helical screw compactor 60, driven by motor 62, is mounted within trash compaction section 64, which communicates at one end with the trash removal opening defined by flange 18. Any dirt, trash, etc., which is deposited in section 64 is compacted in known fashion and ejected from the cleaning apparatus in a tightly compacted mass into bag 16, as previously mentioned.

Figure 5:
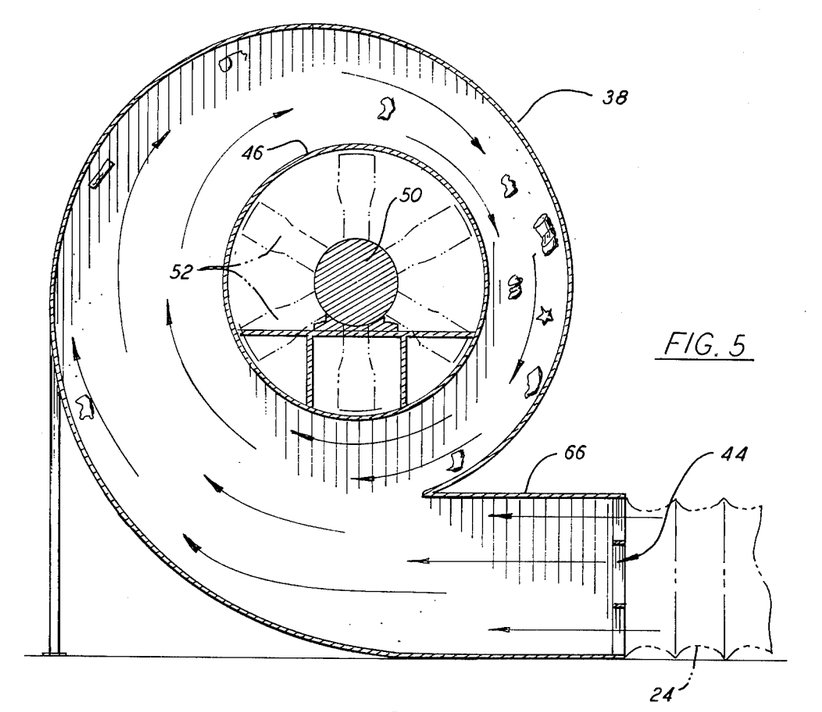
FIGS. 5, 6 and 7 are end elevational views in full section on the lines 5—5, 6—6 and 7—7, respectively, of FIG. 3.

Opening 44 lies in a plane parallel with the longitudinal axis of section 38, with which it communicates at a tangential position through inlet section 66. Section 38 is convolute in cross section, as seen in FIG. 5, decreasing in radius at a constant rate about its axis at the center of cylindrical duct 46 from the lower to the upper side of inlet section 66. Thus, air entering section 38 through opening 44 is caused to rotate about duct 46 with any dirt, trash or other solid materials carried by the air stream being propelled by centrifugal force against the inner, convolute surface of section 38.

Figure 6:
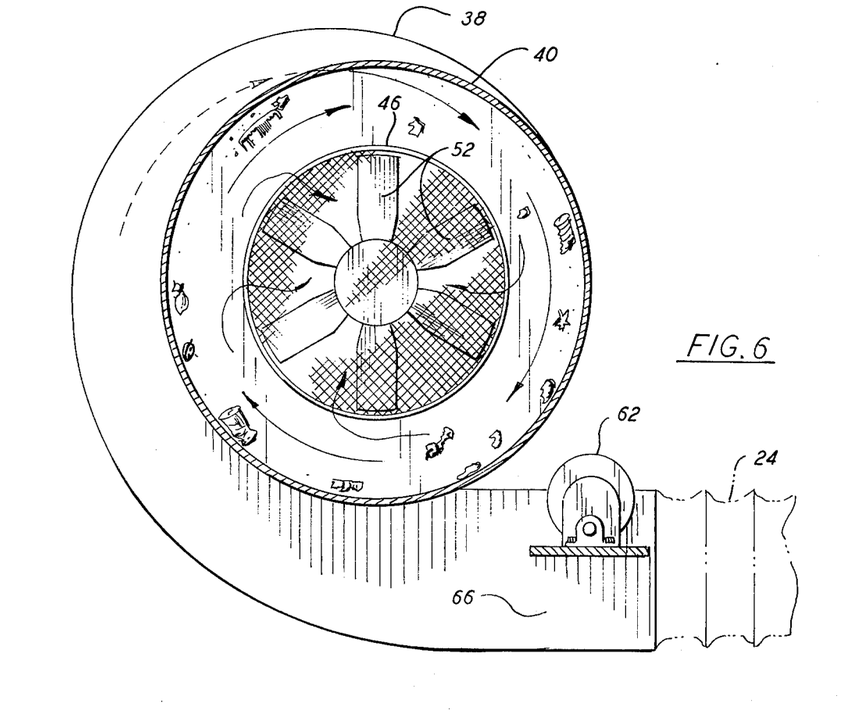

Since the intake end of duct 46 is rearward of section 38, the rotating air stream moves rearwardly from section 38 to section 40 which, as seen in FIG. 6, is circular in cross section. It is also apparent from a consideration of FIG. 4 that flow within inner shell 36 moves from front to rear as the air flows in a circular manner around the inside shell walls, such flow being initially induced by the tangential entrance of air into section 38, and continued by the convolute cross section of section 38 and the presence in the central portion thereof of duct 46. When the air stream reaches the rear section of inner shell 36 it flows about conical protrusion 56 as it turns to the forward direction and flows more or less axially through the central portion of the shell toward and into the intake end of cylindrical duct 36.

Figure 7:
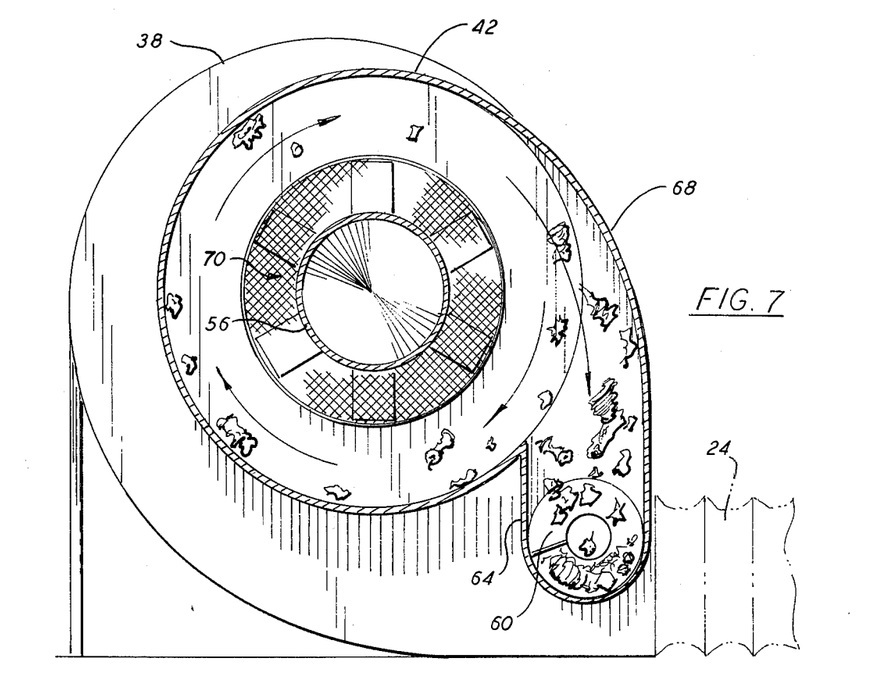

The interior cross section of rearmost portion 42 of inner shell 36 is shown in FIG. 7. Although portion 42 of the rear shell section is of constant radius, i.e., cylindrical in cross section, over the major portion of its internal periphery, it is open at one side, thus being convolute in a portion of its cross section. That portion of the wall forming the convolute section is denoted in FIGS. 3 and 7 by reference numeral 68. The opening formed at the transition from cylindrical to convolute cross section communicates directly with compaction section 64. Thus, dirt, trash and essentially all solid materials carried by the air stream, are deposited in the compaction section where they are compressed into a dense mass by screw compactor 60, ejected from housing 10, and received in flexible bag 16 for convenient disposal.

The air stream is essentially free of all foreign materials as it flows forwardly in the central portion of inner shell 36 and enters duct 46 for exhaust. Screen 70 covers the intake end of duct 46 to insure that no foreign matter of appreciable size will pass through fan blades 52. Also, access door 14 allows visual inspection of the interior of inner shell 36 and manual removal of any large debris or clogs from compaction section 64.

Figure 8A:
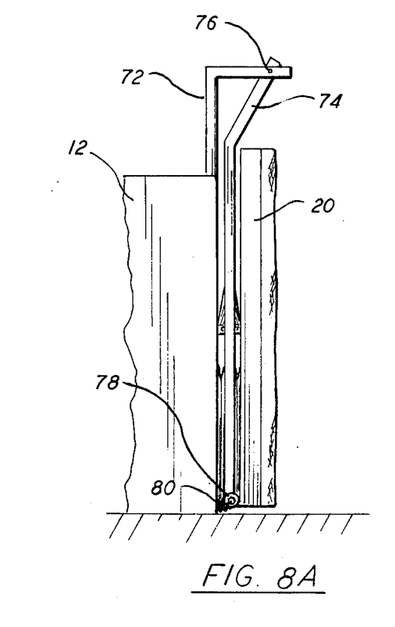
FIGS. 8A and 8B are fragmentary, elevational views of movable portions of the apparatus shown in retracted and extended positions, respectively.
Figure 8B:
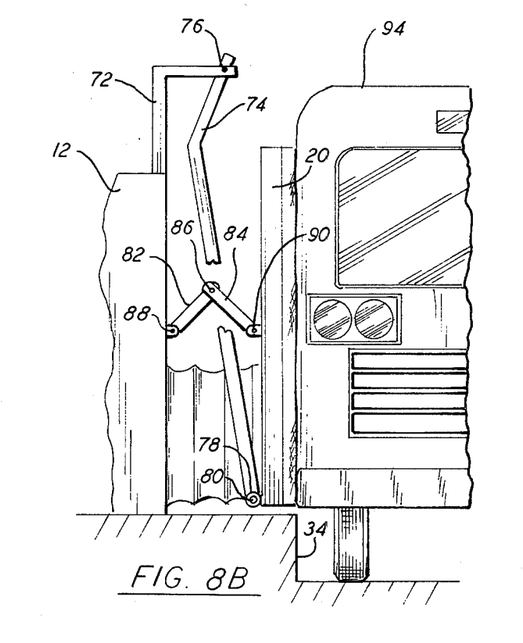

Turning now to FIGS. 8A and 8B, the linkage connecting frame 20 to housing 10 and effecting relative movement thereof is shown in more detail. The linkage and support elements shown in these Figures are identically duplicated in structure and operation on each side of frame 20, as is apparent from FIG. 1, and are therefore described on one side only. L-shaped support 72 is rigidly attached to outer shell 12 of housing 10. Angled, rigid arm 74 is pivotally attached at 76 to support 72 and rigidly attached at the opposite end to hollow sleeve 78. Bar 80 extends across the lower inside edge of frame 20 and is rigidly attached thereto in a central portion of the rod, the ends of which rotatably extend through sleeves 78.

A pair of scissor linkage arms are pivotally connected to one another at one end of each as indicated in FIG. 8B at 86. Arm 82 is pivotally connected at its other end to fixed bracket 88 on outer shell 12, and arm 84 is similarly connected to bracket 90 on frame 20. Pneumatic cylinder 92 (FIG. 1) is pivotally connected to a fixed portion of outer shell 12 and the reciprocating piston rod is attached at pivot point 86 of arms 82 and 84.

When the piston of cylinder 92 is retracted, scissor linkage arms 82 and 84 are folded essentially into superposition. Arm 76 is compactly positioned over the major portion of its length between outer shell 12 and frame 20 in parallel relation to the vertical portion thereof, the elements being in the retracted position of FIG. 8A. When a bus is positioned with its front door adjacent frame 20, the piston of cylinder 92 is extended, moving pivot point 86 downwardly and outwardly from housing 10. Scissor arms 82 and 84 are unfolded and extended as arm 74 pivots about both ends. The portion of frame 20 contacting the exterior of the bus, a fragment of which is indicated by reference numeral 94 in FIG. 8B, will be in essentially sealing engagement therewith when the pneumatic cylinders are extended to the maximum degree possible, as defined by the distance of bus 94 from housing 10. That is, assuming the exterior surface of the bus around the door opening to be essentially planar, the pivotal mounting of arm 74 at both ends insures that the entire frame will contact the bus surface even though it may not be in a precisely vertical plane. The lower edge of frame 20 is supported above the floor upon which housing 10 rests by arms 74 in both the extended and retracted positions.

With frame 20 engaging bus 94 about the front door, the latter is placed in the open position and one or more operators within the bus remove air hoses 30 from bracket 32 and carry the nozzle ends to the rear of the bus. All windows are closed except the rear ones on both sides of the bus and the equipment is turned on, providing concentrated jets of compressed air from hoses 30 and an air stream traveling through the bus from the rear to the front as air is exhausted from inner shell 36. The operators direct the air jets over the seats and other interior surfaces of the bus to dislodge any dirt, trash and other foreign materials and insure that they are carried by the air stream out of the bus door and into the cleaning apparatus. Since opening 44 communicates with the interior of the bus only in the lower portion of the door, the air stream is concentrated near floor level, thereby avoiding a large amount of air turbulence and floating dirt or dust within the bus. It is also apparent from the foregoing description that the other earlier mentioned advantageous operating features are also carried into effect by the cleaning apparatus of the invention.

What is claimed is:

1. Apparatus for removing dirt, trash, and other loose foreign materials from an enclosed interior space having openings substantially at opposite ends thereof by means of an air stream flowing into one and out of the other of the openings, said apparatus comprising:
    a. a housing having parallel front and rear end walls;
    b. a forward section of said housing adjoining said front wall and extending rearwardly therefrom for a portion of the distance between said front and rear walls and having an interior surface which is convolute in a plane parallel to said end walls;
    c. a cylindrical duct having a first open end communicating with an air outlet opening in said front wall and extending through said forward section, substantially coaxially thereof, to a second open end intermediate of said end walls;
    d. means defining an air inlet opening tangential to said interior surface of said forward section;
    e. a fan mounted within said cylindrical duct for exhausting air from within said housing through said air outlet opening, thereby drawing air into said housing through said tangential air inlet opening and creating a circular flow of air about said convolute surface, exteriorly of said circular duct;
    f. a rear section of said housing between said forward section and said rear wall having a cross section such that said flow of air continues in a circular manner from front to rear within said housing before flowing to the central portion of said housing and moving forwardly into and through said cylindrical duct;
    g. a trash receiving section communicating with said rear section through an opening in the interior wall thereof adjacent to and extending forwardly from said rear wall, whereby solid material carried by said flow of air is deposited in said trash receiving section as the air flow moves forwardly to said circular duct inlet;
    h. means for removing solid material from said trash receiving section; and
    i. means for placing said air inlet opening in substantially sealing communication with said enclosed interior space through said other opening thereof.

2. The invention according to claim 1 wherein said sealing communication means comprises a rectangular frame defining an opening and mounted for movement in a substantially vertical plane between extended and retracted positions with respect to said housing.

3. The invention according to claim 2 and further including wall means covering the opening defined by said frame from the upper edge thereof for a predetermined portion of its height, whereby the communication with said air inlet opening is through the lower portion of the opening defined by said frame.

4. The invention according to claim 2 and further including linkage means connecting said frame to said housing for movement relative thereto and having on each of the two vertical sides of said frame a pair of scissor arms pivotally connected to one another at one end of each and pivotally connected to said housing and said frame at their respective opposite ends, a rigid arm pivotally connected at opposite ends to said frame and to support means fixed with respect to said housing, and a rod selectively extensible and retractable to effect movement of said frame as each of said scissor and rigid arms are moved about their respective pivotal connections.

5. The invention according to claim 4 wherein said frame opening communicates with said air inlet opening through a flexible duct and said frame is supported with its lower, horizontal edge above the level of the plane upon which said housing rests by said linkage means.

6. The invention according to claim 1 wherein the combined length of said forward section and said opening in the interior wall of said rear section is less than the distance between said front and rear end walls.

7. The invention according to claim 6 wherein the interior wall of said housing lying between said forward section and said opening in the interior wall of said rear section is circular in cross section.

8. The invention according to claim 7 wherein said second end of said duct is within said circular cross section portion of said housing.

9. The invention according to claim 1 wherein said means for removing solid material comprises a screw compactor.

10. The invention according to claim 1 and further including a conical protrusion extending from a base coplanar with said rear wall to a point coaxial with the axis of said cylindrical duct and spaced rearwardly from said second end thereof.

* * * * *